United States Patent [19]
Choi

[11] Patent Number: 5,999,349
[45] Date of Patent: Dec. 7, 1999

[54] WAVEFORM EQUALIZATION APPARATUS

[75] Inventor: Byung-Bong Choi, Seoul, Rep. of Korea

[73] Assignee: Daewoo Electronics Co., Ltd., Rep. of Korea

[21] Appl. No.: 08/958,653

[22] Filed: Oct. 27, 1997

[30] Foreign Application Priority Data

Dec. 30, 1996 [KR] Rep. of Korea ........................ 96-76493
Dec. 30, 1996 [KR] Rep. of Korea ........................ 96-76494

[51] Int. Cl.$^6$ .............................. G11B 5/035; G11B 5/09
[52] U.S. Cl. ................................. 360/46; 360/65
[58] Field of Search ....................... 360/46, 65; 375/232, 375/290, 348

[56] References Cited

U.S. PATENT DOCUMENTS

| | | | |
|---|---|---|---|
| 4,789,994 | 12/1988 | Randall et al. | 375/233 |
| 4,803,438 | 2/1989 | Mizoguchi | 329/310 |
| 5,157,690 | 10/1992 | Buttle | 375/232 |

*Primary Examiner*—W. R. Young
*Assistant Examiner*—Regina Y. Neal
*Attorney, Agent, or Firm*—Anderson Kill & Olick

[57] ABSTRACT

A waveform equalization apparatus equalizes a digital information signal reproduced from a recording medium by multiplying the reproduced digital information signal and delayed signals thereof by tap coefficients, wherein each of the tap coefficients is adaptively controlled. An output signal of a transversal filter for each of a plural number of symbol data included in a digital information signal reproduced from a target track is compared with predetermined thresholds to obtain a plausible digital information signal. An amplitude difference between the output signal and the plausible digital information signal is calculated. Thereafter, the tap coefficients of each symbol data and the output signals of the plural number of symbol data are analyzed to provide a coefficient value status signal indicating whether the tap coefficients are converged or diverged and a data analysis result signal representing whether an eye pattern of the output signals is open or closed. Based on the coefficient value status signal and the data analysis result signal, predetermined initial tap coefficients, or new tap coefficients is selectively providing as the tap coefficients, wherein the new tap coefficients are obtained by using the amplitude difference, the reproduced digital information signal and the delayed signals thereof.

12 Claims, 6 Drawing Sheets

WAVEFORM EQUALIZATION APPARATUS

FIELD OF THE INVENTION

The present invention relates to a waveform equalization apparatus; and, more particularly, to an improved waveform equalization apparatus which is capable of converging tap coefficients to be used in equalizing a reproduced information signal to their optimum values.

BACKGROUND OF THE INVENTION

A conventional transversal filter used as a waveform equalizer automatically controls tap coefficients of delay elements having an inter-tap delay identical to a signal period. The filter is basically stable in view of the fact that it is of a non-cyclic type.

In a magnetic recording and reproducing apparatus for recording and reproducing a digital information signal through the use of a partial response method, there is used a waveform equalizer which employs the transversal filter. In such a filter, a reproduced digital information signal is adaptively adjusted according to the difference between an output of the filter and an estimated value thereof in order to suppress the inter-symbol interferences in the reproduced digital information signal, wherein the estimated value is obtained by mapping the output to one of predetermined ternary values. The output of the filter is subjected to a symbol decoder, e.g., Viterbi decoder, and an error correction device, e.g., RS (Reed Solomon) decoder.

Figure 1:
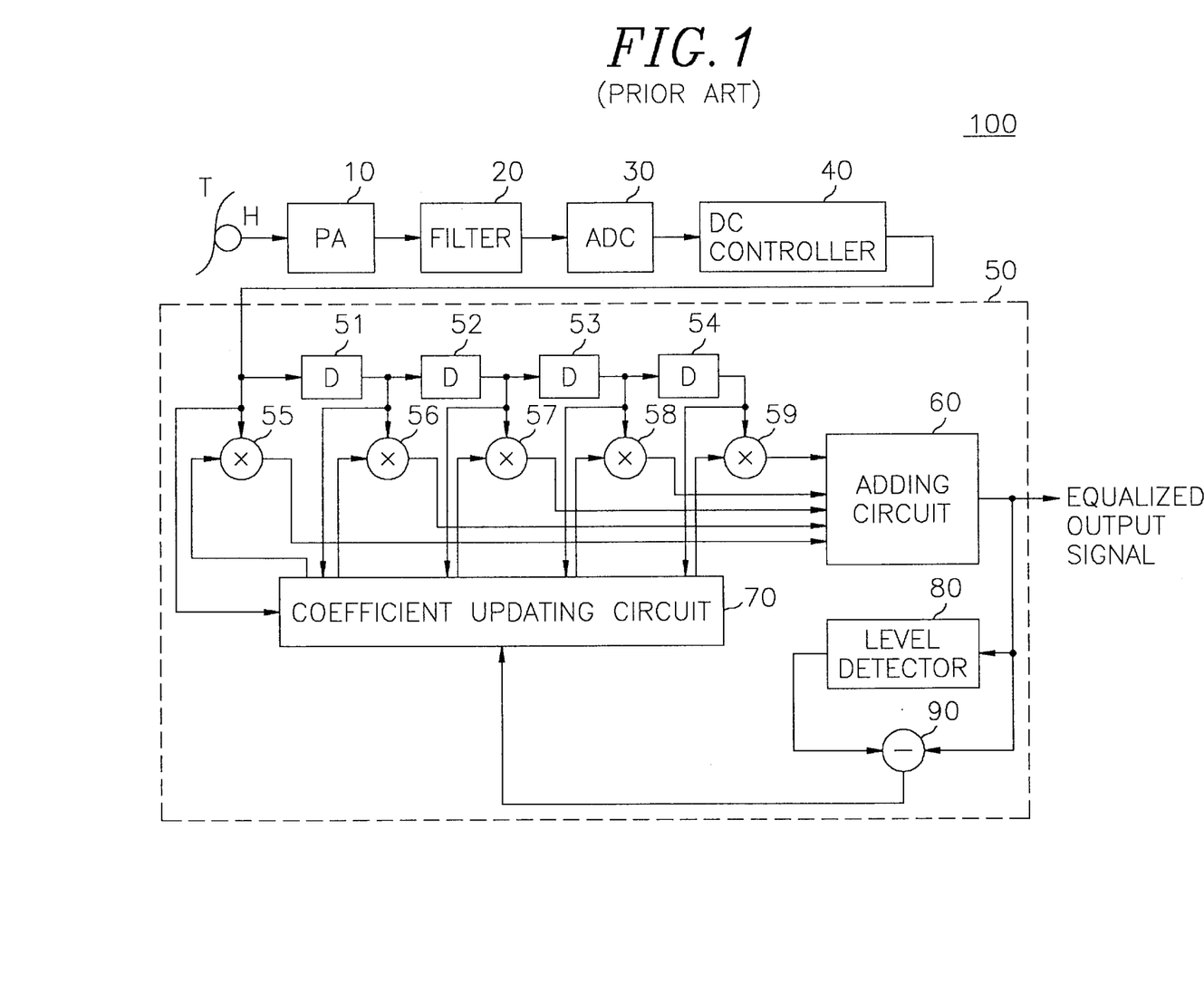
FIG. 1 is a block diagram of a reproducing circuit having a conventional waveform equalizer.

FIG. 1 depicts a reproducing circuit 100 of the aforementioned conventional magnetic recording and reproducing apparatus. Specifically, a reproduced information signal, which is obtained by scanning a magnetic tape T with the aid of a magnetic head H installed on a rotary drum (not shown), is amplified to a predetermined level by a pre-amplifier (PA) 10 and then noise components contained in the amplified information signal are removed by a filter 20. Thereafter, the filtered information signal is converted into a digital information signal by an analog-to-digital converter (ADC) 30. At a direct current (DC) controller 40, the digital information signal is adjusted to issue a DC level as a reproduced digital information signal to a waveform equalizer 50. As shown in FIG. 1, the waveform equalizer 50 includes four delay circuits 51–54, five multipliers 55–59, an adding circuit 60, a coefficient updating circuit 70, a level detector 80 and a subtractor 90.

The delay circuits 51–54 sequentially delay the reproduced digital information signal applied thereto by a predetermined amount by each of them. The reproduced digital information signal from the DC controller 40 and each of the delayed digital information signals are then supplied to respective corresponding multipliers 55–59, wherein each signal applied to each corresponding multiplier is multiplied by a corresponding tab coefficient outputted from the coefficient updating circuit 70 which will be described later, thereby obtaining outputs from the multipliers 55–59 weighted by the tab coefficients. Thereafter, the adding circuit 60 adds the outputs of the multipliers 55–59 together and provides the sum, as an equalized output signal, to a symbol decoder and an error correction device (not shown), the level detector 80 and the subtractor 90. The level detector 80 compares the equalized output signal with predetermined thresholds to detect a level of the equalized output signal and provides the detected level to the subtractor 90.

At the subtractor 90, an amplitude error of the equalized output signal with respect to an expectation value of the equalized output signal is derived by calculating the difference between the detected level from the level detector 80, i.e., the expectation value, and the equalized output signal of the adding circuit 60, wherein the expectation value is one of, e.g., ternary values of −1, 0, 1. Subsequently, the amplitude error is fed to the coefficient updating circuit 70 which outputs the tap coefficients by multiplying the amplitude error by the reproduced digital information signal and the outputs of the delay circuits 51–54. By multiplying the reproduced digital information and the delayed signals thereof by the tap coefficients, the waveform equalization of the reproduced digital information signal can be accomplished by suppressing the inter-symbol interferences contained therein.

However, in the conventional waveform equalizer, there may occur a divergence of the tap coefficients in the event that the reproduced digital information signal which is severely distorted due to a damage to the tape is supplied to the equalizer. Once the tap coefficients have been diverged, a further coefficient updating operation is not performed in the waveform equalizer although the supply of the normal reproduced digital information signal thereto is resumed. Therefore, it is desirable to take an action for coefficient updating of the tap coefficients to their optimum values immediately when the tap coefficients are diverged.

SUMMARY OF THE INVENTION

It is, therefore, a primary object of the present invention to provide an improved waveform equalization apparatus which is capable of converging tap coefficients to their optimum values through the use of an effective data and coefficient value analyzing technique.

In accordance with one aspect of the invention, there is provided a waveform equalization apparatus adopting a transversal filter for suppressing inter-symbol interferences of a digital information signal reproduced from a recording medium having a multiplicity of tracks through a head by summing weighted values obtained by multiplying the reproduced digital information signal and delayed signals thereof by tap coefficients, wherein each of the tap coefficients is controlled and the reproduced digital information signal includes a plurality of symbol data, the apparatus comprising:

means for comparing an output signal of the transversal filter for each of a plural number of symbol data included in a digital information signal reproduced from a target track with predetermined thresholds to obtain a plausible digital information signal;

means for calculating an amplitude difference between the output signal and the plausible digital information signal;

analyzing means for analyzing the tap coefficients of each symbol data and the output signals of the plural number of symbol data, to thereby provide a coefficient value status signal indicating whether all of the tap coefficients are converged or diverged and a data analysis result signal representing whether an eye pattern of the output signals is open or closed; and selection and coefficient updating means, based on the coefficient value status signal and the data analysis result signal, for selectively providing, as the tap coefficients, predetermined initial tap coefficients, or new tap coefficients obtained by using the amplitude difference, the reproduced digital information signal and the delayed signals thereof.

In accordance with another aspect of the invention, there is provided an apparatus for reproducing an information signal recorded on a recording medium, the apparatus comprising:

means for filtering an information signal reproduced by scanning the recording medium by a head installed on a drum to remove noise components contained in the reproduced information signal and converting the filtered information signal into a digital information signal; and waveform equalization device adopting a transversal filter for suppressing inter-symbol interferences of the reproduced information signal by summing weighted values obtained by multiplying the transmitted information signal and delayed signals thereof by tap coefficients, each of the tap coefficients being controlled and the reproduced digital information signal including a plurality of symbol data, wherein the waveform equalization device includes:

means for comparing an output signal of the transversal filter for each of a plural number of symbol data included in a digital information signal reproduced from a target track with predetermined thresholds to obtain a plausible digital information signal;

means for calculating an amplitude difference between the output signal and the plausible digital information signal;

analyzing means for analyzing the tap coefficients of each symbol data and the output signals of the plural number of symbol data, to thereby provide a coefficient value status signal indicating whether all of the tap coefficients are converged or diverged and a data analysis result signal representing whether an eye pattern of the output signals is open or closed; and selection and coefficient updating means, based on the coefficient value status signal and the data analysis result signal, for selectively providing, as the tap coefficients, predetermined initial tap coefficients, or new tap coefficients obtained by using the amplitude difference, the reproduced digital information signal and the delayed signals thereof.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 2:
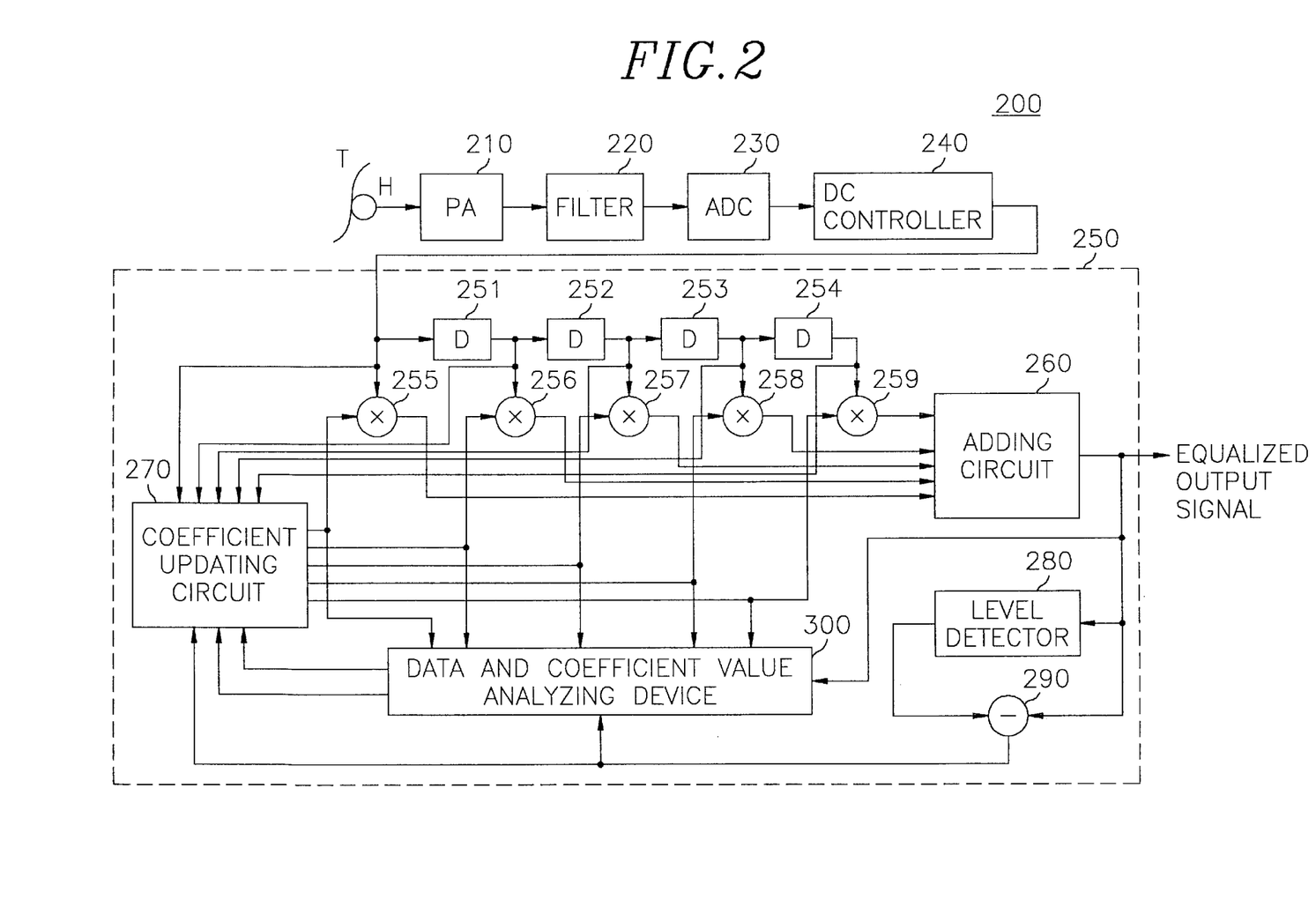
FIG. 2 shows a block diagram of a reproducing circuit which is equipped with a waveform equalization apparatus in accordance with the present invention.

Referring to FIG. 2, there is depicted a block diagram of a reproducing circuit 200 which is provided with a waveform equalization apparatus 250 in accordance with the present invention. The reproducing circuit 200 comprises a PA 210, a filter 220, an ADC 230, a DC controller 240 and a waveform equalization apparatus 250. As shown in FIG. 2, the waveform equalization apparatus 250 includes four delay circuits 251–254, five multipliers 255–259, an adding circuit 260, a coefficient updating circuit 270, a level detector 280, a subtractor 290, and a data and coefficient value analyzing device 300. Even though there are illustrated the four delay circuits and the five multipliers for the sake of simplicity, it should be noted that their respective numbers may vary depending on the tap number of a transversal filter used as the waveform equalization apparatus. As may be seen from the above, the inventive reproducing circuit 200 is constructed by additionally inserting the data and coefficient value analyzing device 300 into the conventional reproducing circuit disclosed above in the Background of the Invention.

Specifically, an information signal having a plurality of symbol data recorded on a tape T is first reproduced by scanning the tape T by a magnetic head H installed on a rotary drum (not shown) and then supplied, on a symbol-by-symbol basis, to the delay circuits 251–254, the multiplier 255 and the coefficient updating circuit 270 through the PA 210, the filter 220, the ADC 230 and the DC controller 240 which perform the same functions as those of the corresponding elements in FIG. 1. The delay circuits 251–254 sequentially delay the reproduced digital information signal applied thereto by a predetermined amount to provide delayed digital information signals to the corresponding multipliers 256–259. At the multipliers 255–259, the reproduced digital information signal from the DC controller 240 and the delayed digital information signals from the delay circuits 251–254 are multiplied by corresponding tap coefficients from the coefficient updating circuit 270, thereby obtaining signals weighted by the tap coefficients. The multiplication results from the multipliers 255–259 are then provided to the adding circuit 260 which adds them together. In case an original digital information signal waveform is resuppressed by inter-symbol interferences, the inter-symbol interference components of the corrupted waveform are suppressed by the waveform equalization carried out by adding the weighted multiplication results obtained based on the tap coefficients from the coefficient updating circuit 270.

Thereafter, the output from the adding circuit 260 is supplied, as an equalized output signal, to a symbol decoder, an error correction device (not shown), the level detector 280, the subtractor 290, the data and coefficient value analyzing device 300. The level detector 280 determines an expectation value of the equalized output signal applied thereto by comparing the equalized output signal with predetermined signal levels, the expectation value being one of, e.g., ternary values of −1, 0, 1. The determination result is then applied to the subtractor 290 which calculates an amplitude difference or error between the equalized output signal and the expectation value, wherein the amplitude difference is supplied to the data and coefficient value analyzing device 300 and the coefficient updating circuit 270.

At the data and coefficient value analyzing device 300, the equalized output signal provided from the adding circuit 260 and the tap coefficients issued at the coefficient updating circuit 270 are analyzed by using a novel data and coefficient value analyzing scheme of the present invention which will be explained in detail with reference to FIGS. 3–6 hereinafter. Based on the analysis result, the amplitude error from the subtractor 290, or predetermined initial tap coefficients is selectively provided from the data and coefficient value analyzing device 300 to the coefficient updating circuit 270.

Figure 3:
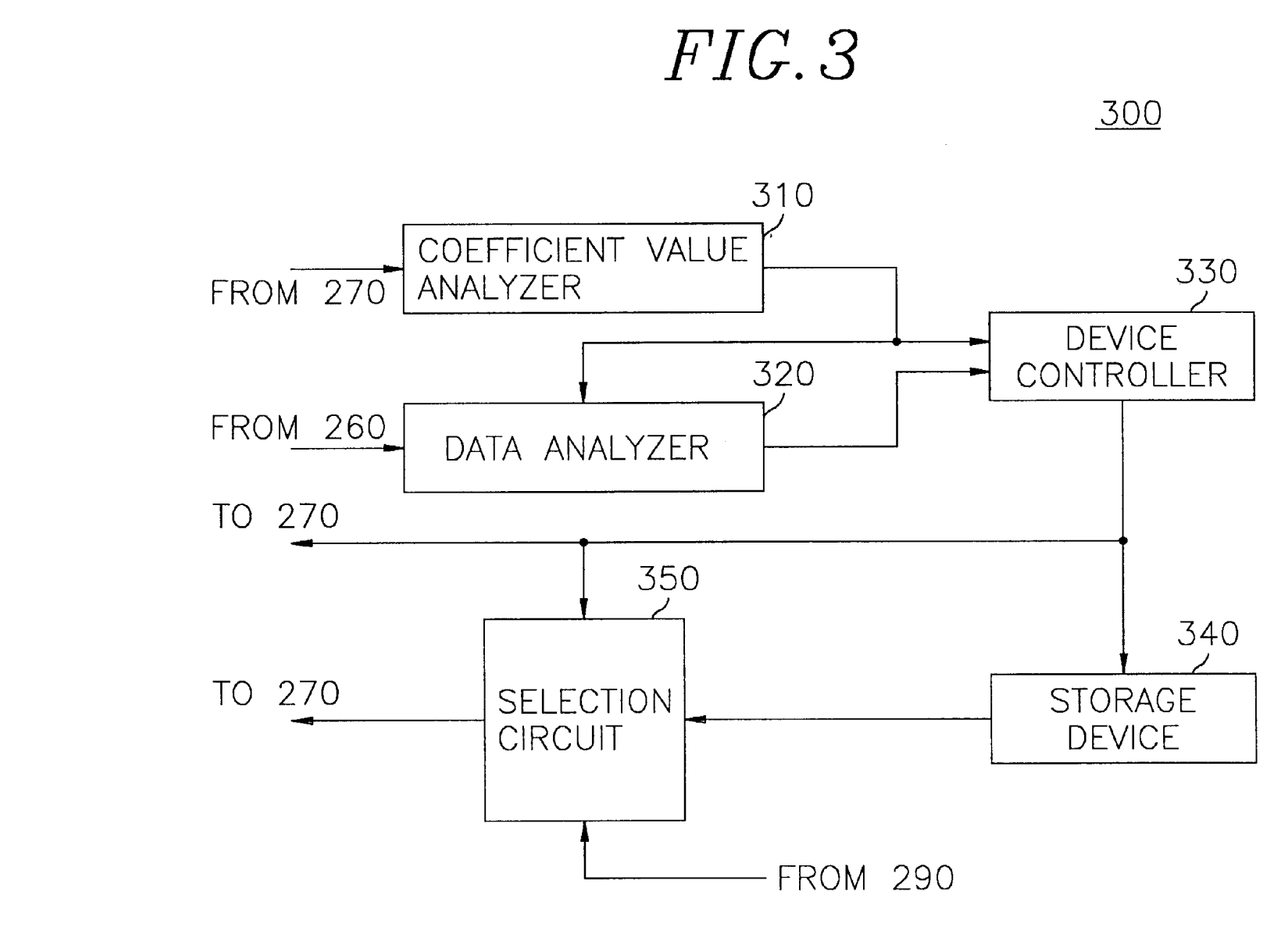
FIG. 3 presents a block diagram of a data and coefficient value analyzing device included in the waveform equalization apparatus shown in FIG. 2.

Turning now to FIG. 3, there is shown a functional block diagram of the data and coefficient value analyzing device 300 shown in FIG. 2. The data and coefficient value analyzing device 300, as shown in FIG. 3, includes a coefficient value analyzer 310, a data analyzer 320, a device controller 330, a storage device 340, and a selection circuit 350. The coefficient value analyzer 310 analyzes each of the tap coefficients from the coefficient updating circuit 270 shown in FIG. 2 to decide whether all the tap coefficients are within predetermined maximum and minimum thresholds. Details of the coefficient value analyzer 310 will be given with reference to FIG. 4 hereinafter.

Figure 4:
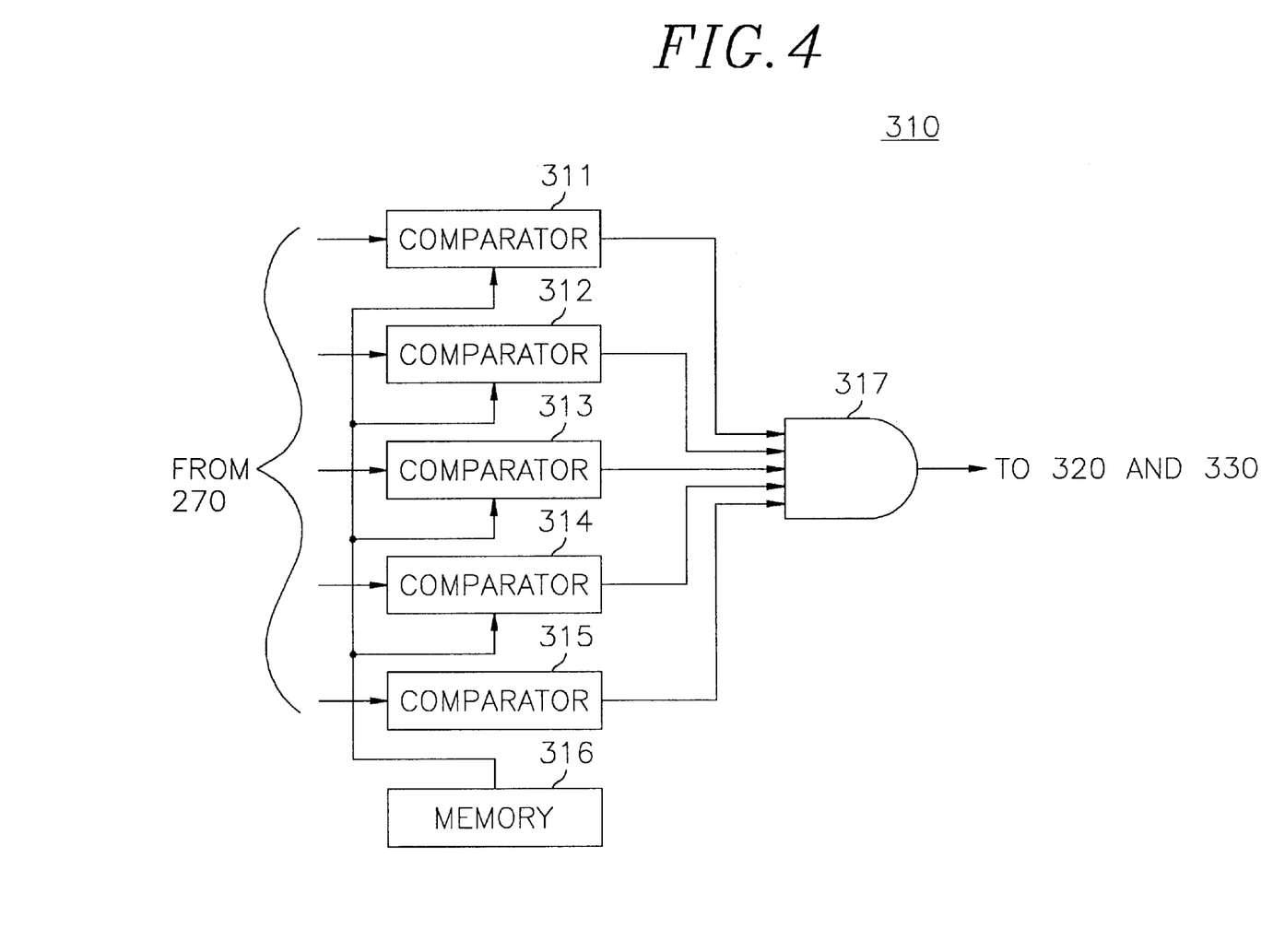
FIG. 4 depicts a detailed block diagram of a coefficient value analyzer shown in FIG. 3.

In FIG. 4, the coefficient value analyzer 310 contains five comparators 311–315, a memory 316 and an AND gate 317. Each of the comparators 311–315 compares a tap coefficient applied thereto from the coefficient updating circuit 270 with the predetermined maximum and minimum thresholds stored in the memory 316 to decide whether the tap coefficient falls within the predetermined maximum and minimum thresholds.

For instance, if the tap coefficient falls within the predetermined maximum and minimum thresholds, said each comparator issues a logic low level; and, if not, it produces a logic high level. The logic high and low levels issued at the comparators 311–315 are then fed to the AND gate 317, wherein the logic levels are logically combined to generate a combined signal as a coefficient value status signal representing the status of the tap coefficients. That is to say, in accordance with the present invention, if all of the inputs to the AND gate 317 are logic high, meaning that the tap coefficients have diverged, the AND gate 317 produces the coefficient value status signal of a logic high level; and, if otherwise, i.e., if any of the inputs to the AND gate 317 is logic low, implying that the tap coefficients have converged, it generates the coefficient value status signal of a logic low level. Subsequently, the coefficient value status signal of the logic high or low level is provided to the data analyzer 320 and the device controller 330 shown in FIG. 3.

Referring back to FIG. 3, the device controller 330, in response to the coefficient value status signal of the logic high level from the AND gate 317, generates a device control signal having a logic high value regardless of any signal from the data analyzer 320. In response to the coefficient value status signal of the logic low value from the AND gate 317, however, the device controller 330 generates the device control signal of a logic high or low level by taking account of a data analysis result signal from the data analyzer 320 which will be fully explained with reference to FIGS. 5 and 6 hereinafter, wherein the data analysis result signal indicates whether an eye pattern of the equalized output signal from the adding circuit 260 shown in FIG. 2 is open or close, as will be further described later.

Figure 5:
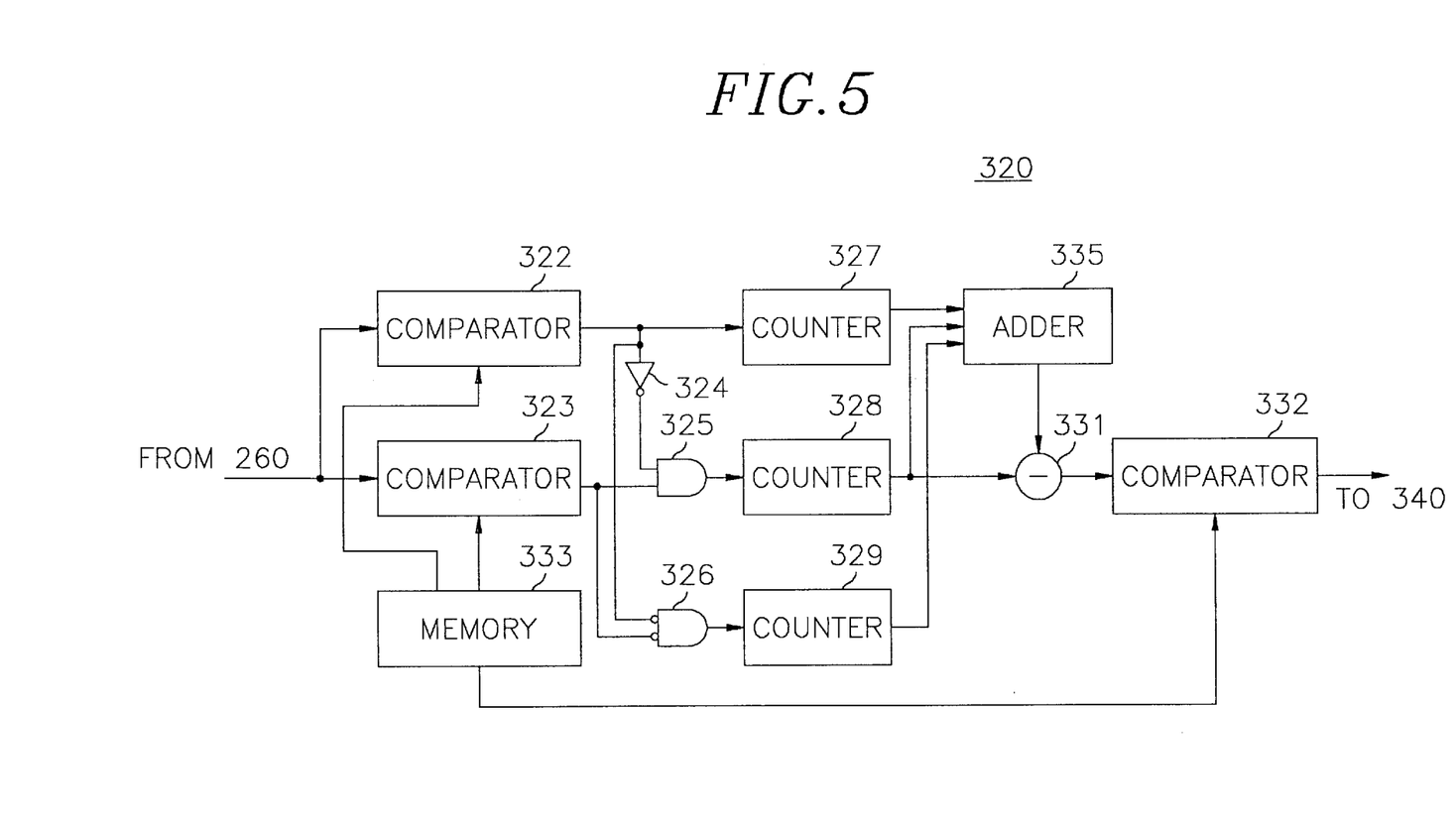
FIG. 5 offers a detailed block diagram of a data analyzer shown in FIG. 3.
Figure 6:
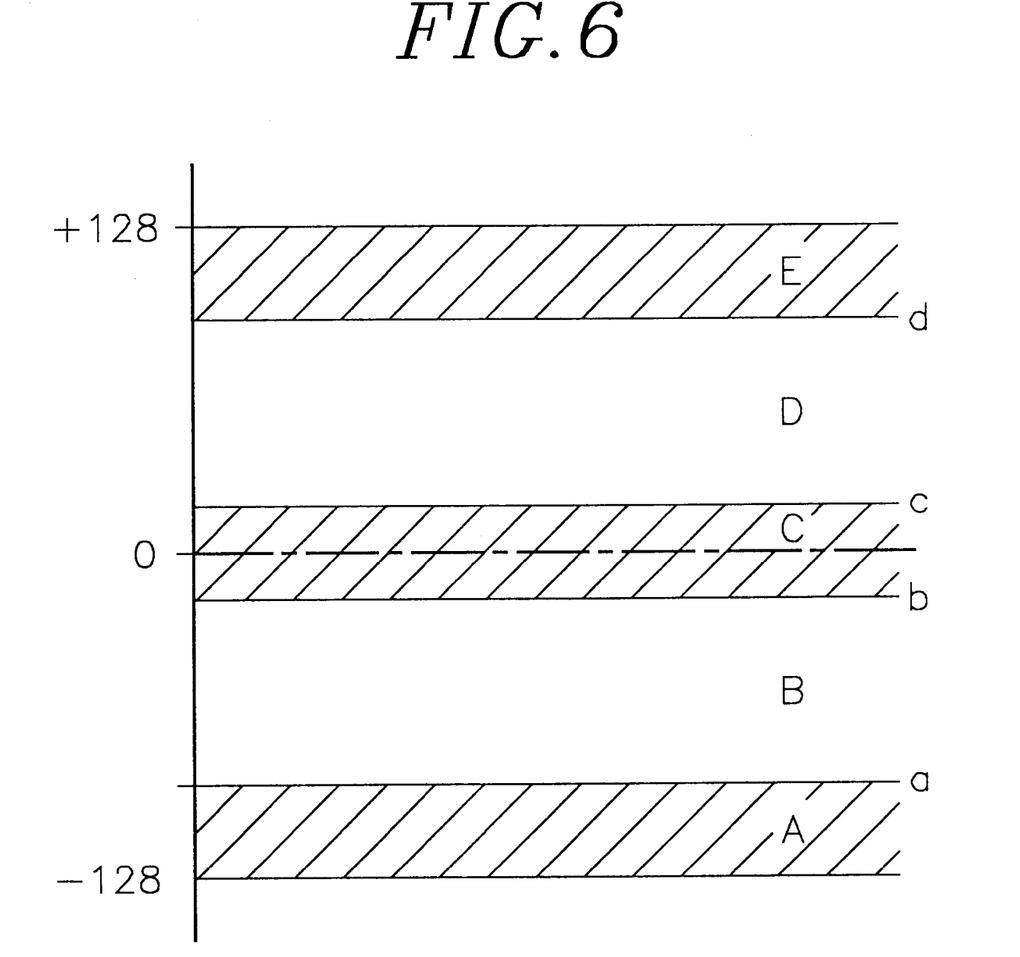
FIG. 6 presents a diagram for explaining a data analyzing scheme employed in the data analyzer in accordance with the present invention.

With reference to FIGS. 5 and 6, the data analyzer 320 contains three comparators 322, 323 and 332, three counters 327–329, a subtractor 331, a memory 333, and an adder 335. The comparator 322 compares the equalized output signal from the adding circuit 260 shown FIG. 2 with each of two predetermined threshold values, e.g., a and d illustrated in FIG. 6. And, the comparator 323 compares the equalized output signal with each of another two predetermined threshold values, e.g., b and c shown in FIG. 6. Those four predetermined threshold values are decided in advance based on a bit number of each symbol data of the input information signal; and stored in the memory 333. In other words, as may be seen from FIG. 6, in case the bit number of each symbol data is 8-bits, resulting in symbol data ranging from −128 to +128, the former two predetermined threshold values, a and d, are obtained by adding a certain value to −128 and by subtracting the same from +128, respectively, whereas the latter two predetermined threshold values, b and c, are derived by subtracting a certain value from 0 and by adding the same to 0, respectively. The four predetermined threshold values have a relationship of a<b<c<d, wherein a and d are of a same magnitude with different signs and b and c also have a same magnitude with different signs.

For instance, at the comparator 322, if the equalized output signal belongs to a region A of FIG. 6, i.e., the equalized output signal being larger than −128 and equal to or smaller than the former first predetermined threshold value a, or is within a region E of FIG. 6, i.e., the equalized output signal being smaller than +128 and equal to or larger than the former second predetermined threshold value d, the comparator 322 issues a first comparison signal of a logic high level; and, if not, it issues that of a logic low level. Similarly, at the comparator 323, if the equalized output signal belongs to a region C of FIG. 6, i.e., the equalized output signal being within the latter two predetermined threshold values b and c, the comparator 323 issues a second comparison signal of a logic high level; and, if not, it issues that of a logic low level. Even though there is not fully explained for the sake of simplicity, it should be noted that the four predetermined threshold values and the five regions are decided depending on a partial response Class-IV.

The first comparison signal is supplied to the counter 327, an inverter 324 and an AND gate 326, while the second comparison signal is fed to two AND gates 325 and 326. More specifically, the inverter 324 inverts the first comparison signal to provide a first inverted comparison signal to the first AND gate 325. And then, the first AND gate 325 logically combines the two inputs provided from the inverter 324 and the comparator 323 to issue a first AND combined signal to the counter 328. And, the second AND gate 326 logically combines the signals from the comparators 322 and 323 to output a second AND combined signal to the counter 329. In a preferred embodiment of the invention, the inverter 324 and the first AND gate 325 are prepared to provide the first AND combined signal to be used to count the number of the input information signal of each symbol data which is located in regions B and D of FIG. 6, whereas the second AND gate 326 is installed to issue the second AND combined signal to be used to count the number of the input information signal of each symbol data which is located in the region C of FIG. 6.

As shown in FIG. 5, an input to the counter 327 is the first comparison signal from the comparator 322; an input to the counter 328 is the first AND combined signal from the first AND gate 325; and an input to the counter 329 is the second AND combined signal from the second AND gate 326. When the input to the counter 327 is the first comparison signal of the logic high level, it counts the number thereof. And, when the input to the counter 328 is the first AND combined signal of logic high value, it counts the number thereof. Also, when the input to the counter 329 is the second AND combined signal of logic high value, it counts the number thereof. These comparison and counting operations are repeatedly performed for a next symbol data until all the symbol data of the digital information signal read out from the target track of the magnetic tape is processed.

Counting numbers at the counters 327–329 are provided to the adder 335, while the counting number at the counter 328, indicating the number of symbol data which belongs to the regions B and D, is supplied to the subtractor 331. The adder 335 adds the counting numbers from the counters 327–329 together to provide a total counting number to the subtractor 331.

At the subtractor 331, a difference value is obtained by subtracting the counting number provided from the counter 328 from the total counting number from the adder 335; and then the difference value is provided to the comparator 332. The comparator 332 compares the difference value from the subtractor 331 with a predetermined threshold value stored in the memory 333 to provide a comparison result signal. That is, if the difference value from the subtractor 331 is larger than the predetermined threshold value, meaning that the eye pattern of the equalized output signal of the plural of symbol data read out from the target track is open, the comparator 332 outputs the comparison result signal of a logic low value; and, if the difference value is equal to or smaller than the predetermined threshold value, implying that the eye pattern of the equalized output signal is closed, the comparator 332 generates the comparison result signal of a logic high value. The comparison result signal of the logic low or high value is then provided, as the data analysis result signal, to the device controller 330 shown in FIG. 3.

Referring back to FIG. 3, the device controller 330, based on the coefficient value status signal from the coefficient value analyzer 310 and the data analysis result signal from the data analyzer 320, generates a device control signal. That is to say, in response to either one of the coefficient value status signal of the logic high level and the data analysis result signal of a logic high level, the device controller 330 produces the device control signal of a logic high level; and in response to the coefficient value status signal of the logic low level and thereafter the data analysis result signal of the logic low level, it generates the device control signal of a logic low level. The device control signal of the logic high or low level is then fed to the storage device 340, the selection circuit 350, and the coefficient updating circuit 270 shown in FIG. 2.

The selection circuit 350, in response to the device control signal from the device controller 330, selectively outputs the tap coefficients from the coefficient updating circuit 270 or predetermined initial tap coefficients which are retrieved from the storage device 340. In other words, in response to the device control signal of the logic high level, the tap coefficients are returned to the coefficient updating circuit 270 shown in FIG. 2; and in response to the device control signal of the logic low level, the initial tap coefficients from the storage device 340 are supplied to the coefficient updating circuit 270.

Referring back to FIG. 2, the coefficient updating circuit 270, which has an improved version in contrast to the conventional one as illustrated in FIG. 1, effectively obtains the tap coefficients to be sent to the corresponding multipliers 255–259. That is, in response to the device control signal of the logic low level from the device controller 330 shown in FIG. 3, the coefficient updating circuit 270 relays the tap coefficients provided from the selection circuit 350 to the corresponding multipliers 255–259 without any change. But, in response to the device control signal of the logic high level from the device controller 330, the coefficient updating circuit 270 provides the multipliers 255–259 with new tap coefficients which are obtained by using the predetermined initial tap coefficients from the selection circuit 350, the amplitude difference from the level detector 290 and the delayed signals from the delay elements 251–254.

More specifically, in response to the device control signal of the logic high level, the predetermined initial tap coefficients are outputted from the coefficient updating circuit 270. Thereafter, in response to the device control signal of the logic low level, initially, new tap coefficients are derived by adding tap coefficients which are obtained by multiplying the amplitude difference by the delayed signals to predetermined initial tap coefficients delayed by a predetermined amount at a delay circuit (not shown). From then on, the new tap coefficients are updated with tap coefficients which are derived by adding the multiplied tap coefficients to previous new tap coefficients thereof. The tap coefficients outputted from the coefficient updating circuit 270 are provided to the corresponding multipliers 255–259, thereby outputting the equalized output signal which has suppressed inter-symbol interference. As a result, the present invention is capable of effectively equalizing a reproduced information signal by employing tap coefficients obtained by using a data and coefficient value analyzing technique of the present invention.

While the present invention has been shown and described with respect to the particular embodiment, it will be apparent to those skilled in the art that many changes and modifications may be made without departing from the spirit and scope of the invention as defined in the appended claims.

What is claimed is:

1. A waveform equalization apparatus adopting a transversal filter for suppressing inter-symbol interferences of a digital information signal reproduced from a recording medium having a multiplicity of tracks through a head by summing weighted values obtained by multiplying the reproduced digital information signal and delayed signals thereof by tap coefficients, wherein each of the tap coefficients is controlled and the reproduced digital information signal includes a plurality of symbol data, the apparatus comprising:

means for comparing an output signal of the transversal filter for each of a plural number of symbol data included in a digital information signal reproduced from a target track with predetermined thresholds to obtain a plausible digital information signal;

means for calculating an amplitude difference between the output signal and the plausible digital information signal;

analyzing means for analyzing the tap coefficients of each symbol data and the output signals of the plural number of symbol data, to thereby provide a coefficient value status signal indicating whether all of the tap coefficients are converged or diverged and a data analysis result signal representing whether an eye pattern of the output signals is open or closed; and selection and coefficient updating means, based on the coefficient value status signal and the data analysis result signal, for selectively providing, as the tap coefficients, predetermined initial tap coefficients, or new tap coefficients obtained by using the amplitude difference, the reproduced digital information signal and the delayed signals thereof.

2. The apparatus of claim 1, wherein the analyzing means includes:

means for comparing each of the tap coefficients with the predetermined maximum and minimum thresholds to provide a comparison result signal of a first or a second logic level indicating whether or not said each tap coefficient falls within the predetermined maximum and minimum thresholds;

combining means for logically combining the comparison result signals to output a combined signal of a first or a second logic level as the coefficient value status signal; and comparison and decision means for comparing each of the output signals outputted from the transversal filter for the plural number of symbol data with predetermined threshold values, and deciding whether an eye pattern thereof is open or closed based on the comparison results to thereby generate the data analysis result signal of a first or a second logic value.

3. The apparatus of claim 2, wherein the selection and coefficient updating means includes:

means, in response to the coefficient value status signal of the second logic level, for outputting the tap coefficients regardless of the data analysis result signal; and means, in response to the coefficient value status signal of the first logic level and thereafter the data analysis result signal of the second logic level, for selectively outputting the predetermined initial tap coefficients or the new tap coefficients obtained by multiplying the amplitude difference by the reproduced digital information signal and the delayed signals thereof.

4. The apparatus of claim 2, wherein the coefficient value status signal has the second logic level if all of levels of the comparison result signals are second logic level; and the first logic level if otherwise.

5. The apparatus of claim 2, wherein the predetermined threshold values used at the comparison and decision means are decided based on a bit number of each symbol data of the reproduced digital information signal and the number of the predetermined threshold values depends on a type of a partial response class.

6. The apparatus of claim 5, wherein the partial response class type is IV.

7. The apparatus of claim 6, wherein the bit number of each symbol data is 8, said each symbol data ranging between −128 and +128.

8. The apparatus of claim 7, wherein the number of the predetermined threshold values is 4, a, b, c and d satisfying a relationship of a<b<c<d, wherein a and d are of a same magnitude with different signs from each other; and b and c are of a same magnitude with different signs from each other.

9. The apparatus of claim 8, wherein, based on the four predetermined threshold values, there are formed five regions, wherein a upper region is between +128 and the predetermined threshold value d, a bottom region is between −128 and the predetermined threshold value a, and a central region is between the predetermined threshold values b and c.

10. The apparatus of claim 9, wherein the comparison and decision means includes:

comparison and counting means for comparing each of the output signals with the four predetermined threshold values a, b, c and d to count the number of the output signals falling in each region; and means for adding the numbers counted at the comparison and counting means in each of the five regions together to output a total counted value;

means for adding the numbers counted at the comparison and counting means for two regions, one between the predetermined threshold values a and b, and the other between c and d, and subtracting the added counted value from the total counted value to provide a difference value; and means for comparing the difference number with a predetermined value and deciding whether an eye pattern of the output signals is open or closed based on the comparison result to generate the data analysis result signal of the first or the second logic value.

11. The apparatus of claim 10, wherein the comparison and decision means further includes a storage device for storing the four predetermined threshold values and the predetermined value.

12. An apparatus for reproducing an information signal recorded on a recording medium, the apparatus comprising:

means for filtering an information signal reproduced by scanning the recording medium by a head installed on a drum to remove noise components contained in the reproduced information signal and converting the filtered information signal into a digital information signal; and waveform equalization device adopting a transversal filter for suppressing inter-symbol interferences of the reproduced information signal by summing weighted values obtained by multiplying the transmitted information signal and delayed signals thereof by tap coefficients, each of the tap coefficients being controlled and the reproduced digital information signal including a plurality of symbol data, wherein the waveform equalization device includes:

means for comparing an output signal of the transversal filter for each of a plural number of symbol data included in a digital information signal reproduced from a target track with predetermined thresholds to obtain a plausible digital information signal;

means for calculating an amplitude difference between the output signal and the plausible digital information signal;

analyzing means for analyzing the tap coefficients of each symbol data and the output signals of the plural number of symbol data, to thereby provide a coefficient value status signal indicating whether all of the tap coefficients are converged or diverged and a data analysis result signal representing whether an eye pattern of the output signals is open or closed; and selection and coefficient updating means, based on the coefficient value status signal and the data analysis result signal, for selectively providing, as the tap coefficients, predetermined initial tap coefficients, or new tap coefficients obtained by using the amplitude difference, the reproduced digital information signal and the delayed signals thereof.

* * * * *